Sept. 13, 1932.  O. F. CARLSON  1,876,567
STALK SPLITTING ATTACHMENT FOR CORN HARVESTERS
Filed June 25, 1928  4 Sheets-Sheet 1
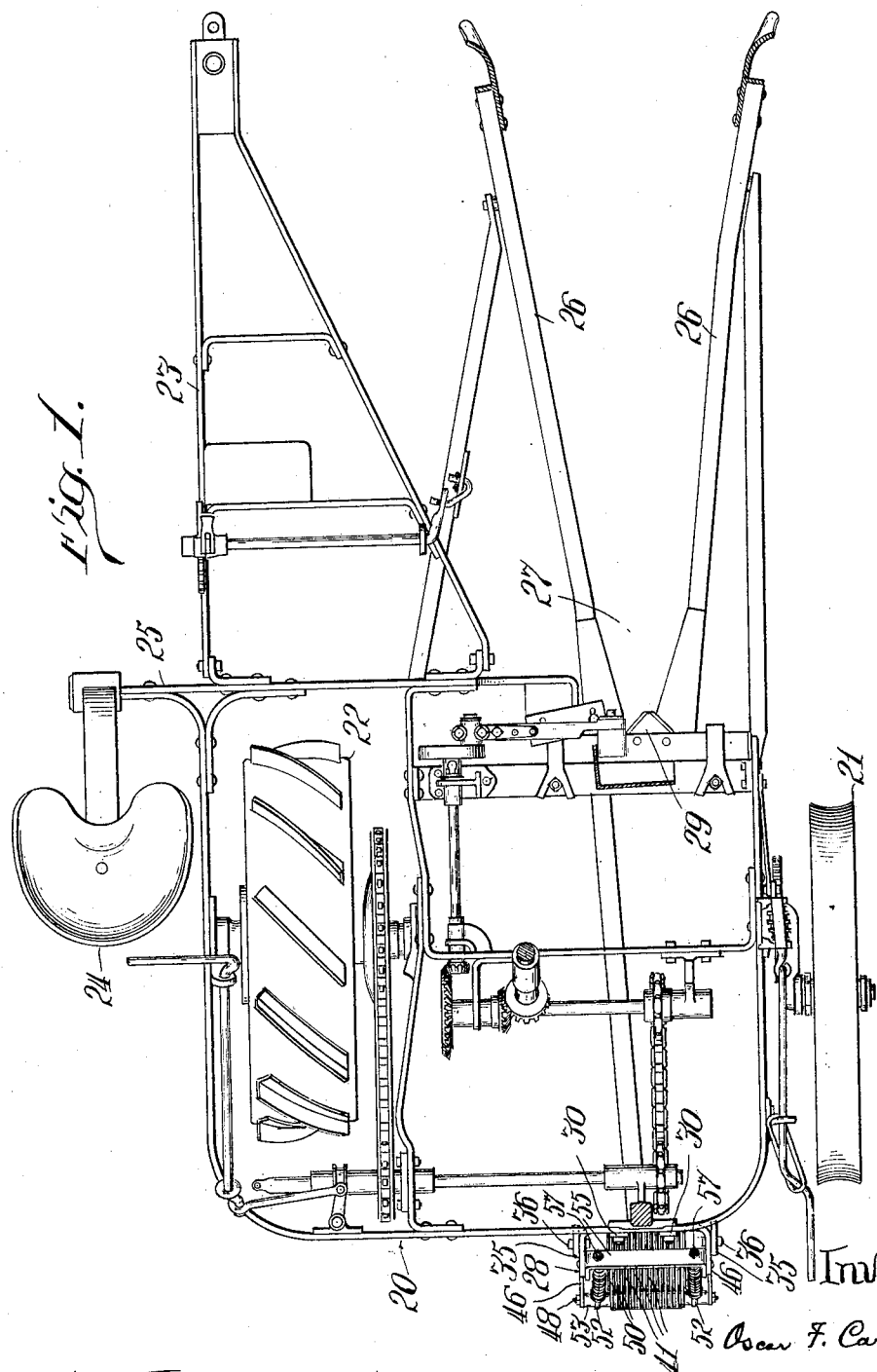

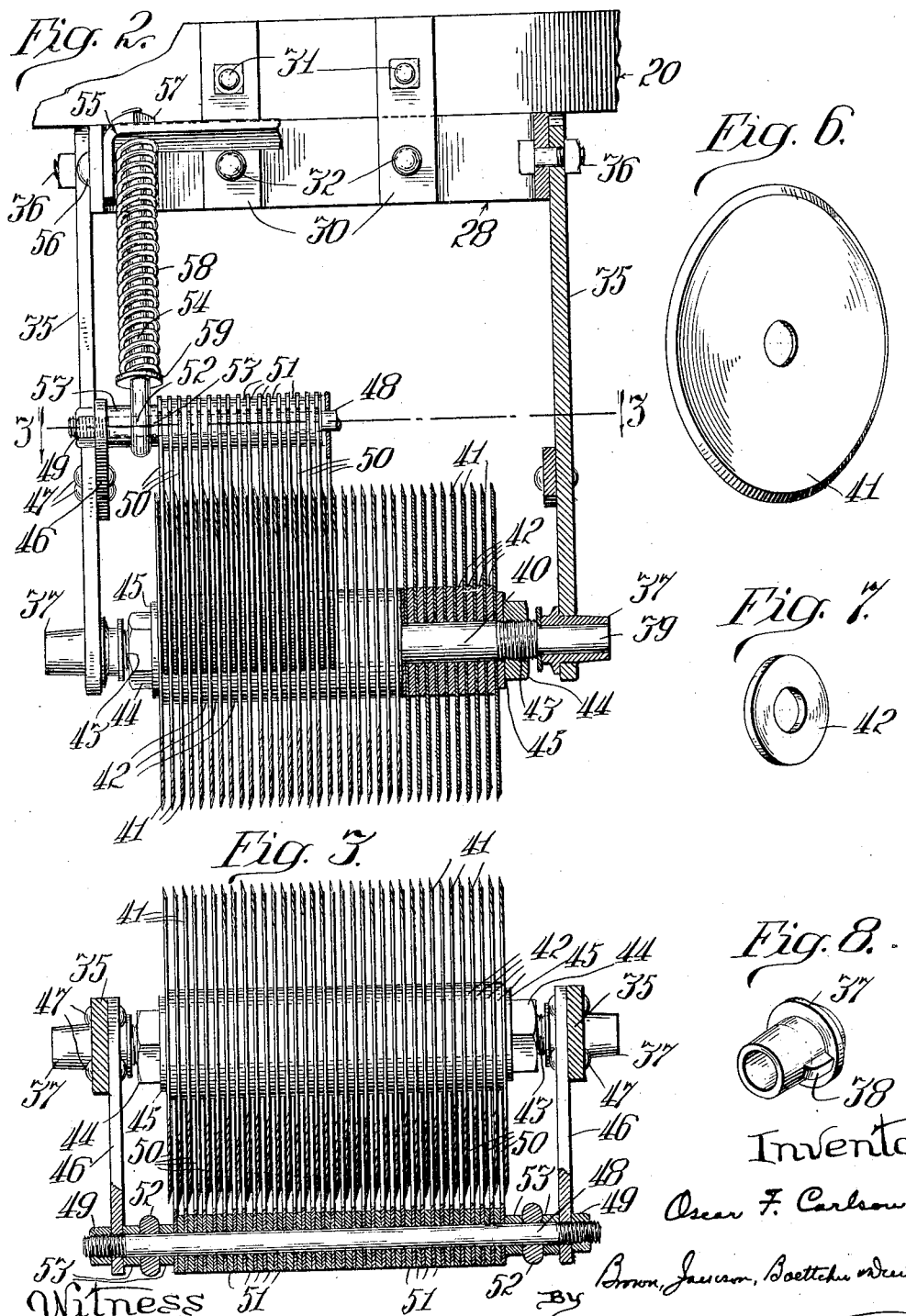

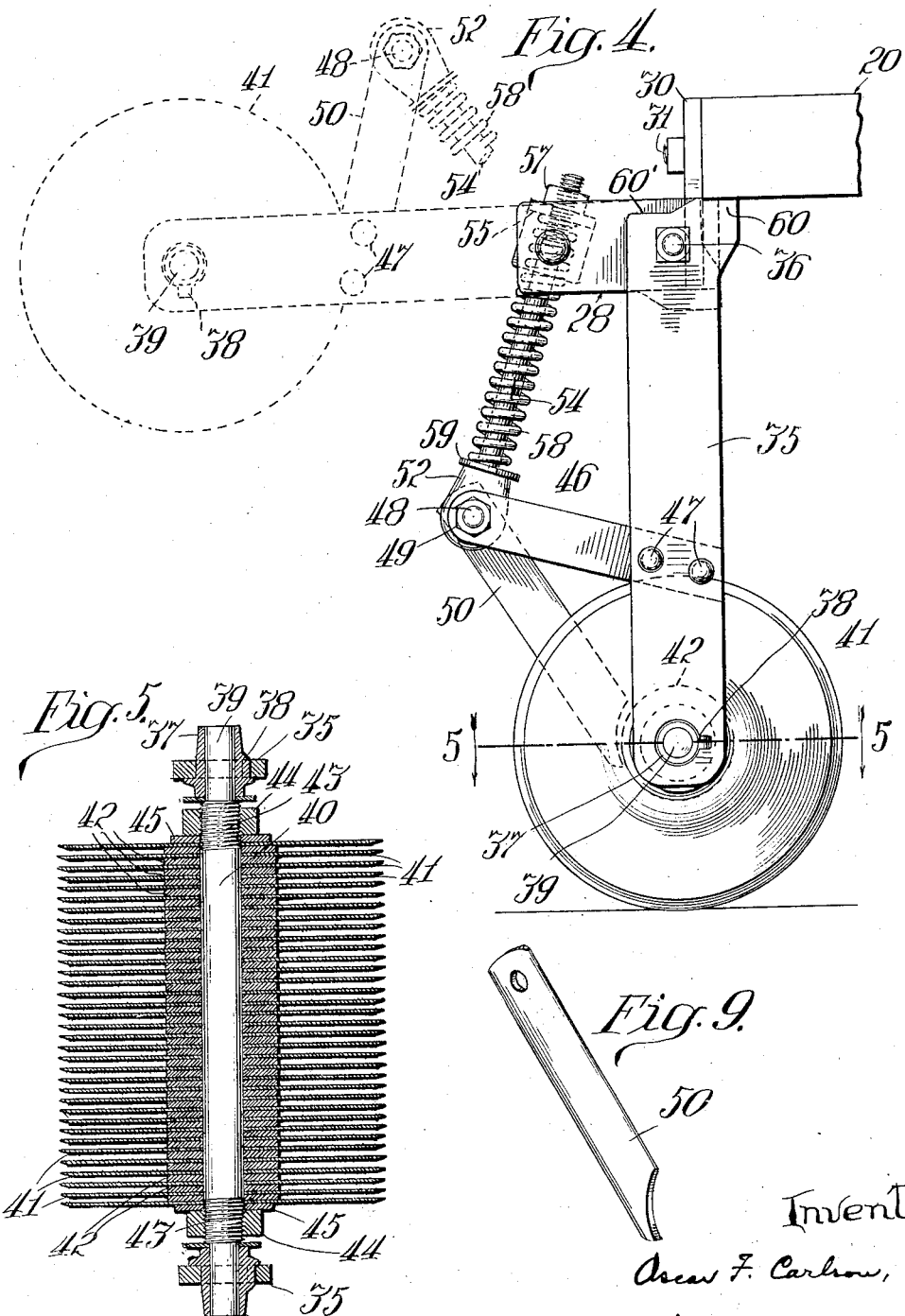

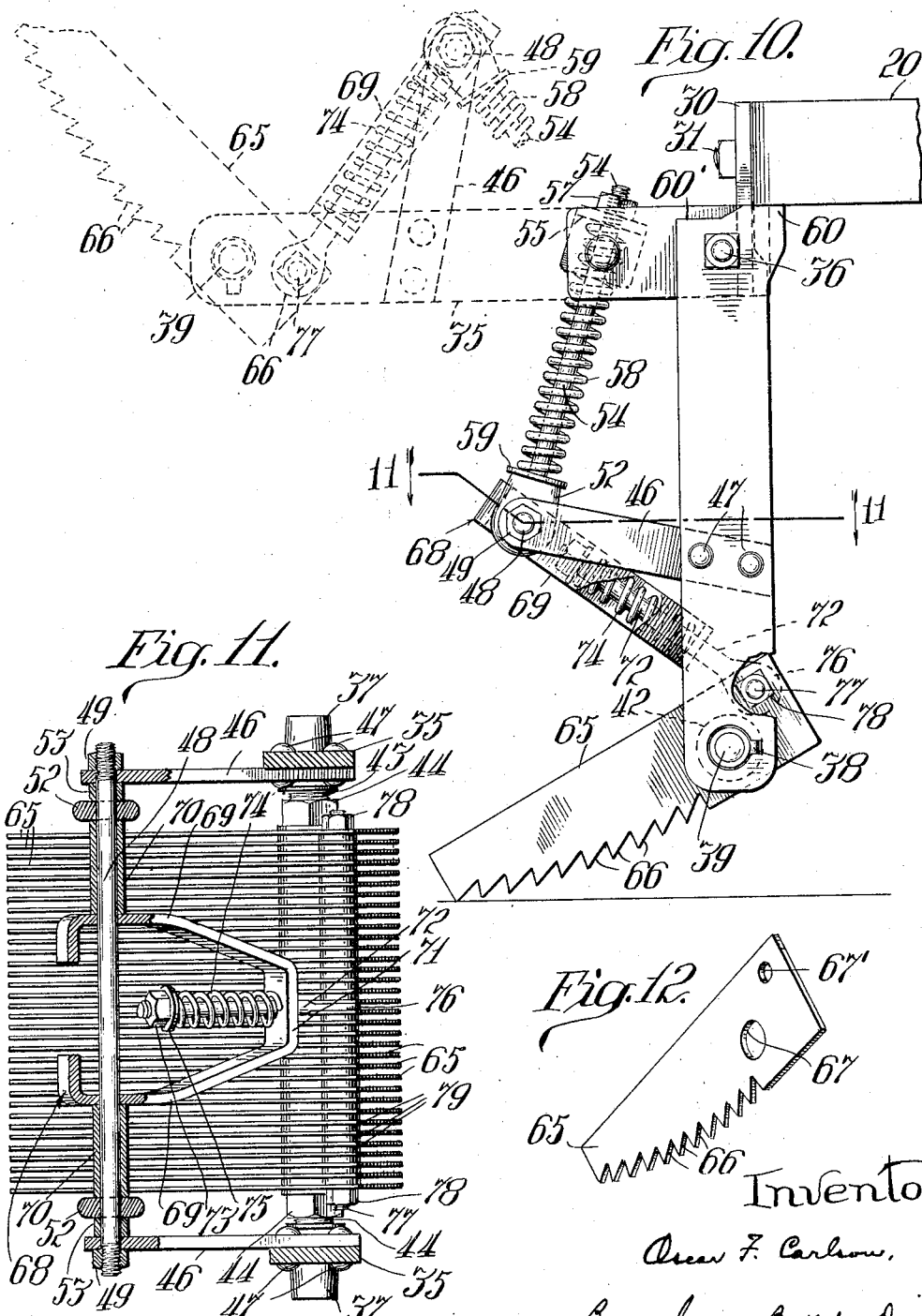

Patented Sept. 13, 1932

1,876,567

UNITED STATES PATENT OFFICE

OSCAR F. CARLSON, OF MOLINE, ILLINOIS, ASSIGNOR TO DEERE & COMPANY, OF MOLINE, ILLINOIS, A CORPORATION OF ILLINOIS

STALK SPLITTING ATTACHMENT FOR CORN HARVESTERS

Application filed June 25, 1928. Serial No. 287,924.

The present invention relates to stalk splitting apparatus for corn harvesters, and aims primarily to provide apparatus of this type which will cut up or shed the corn stubble or base of the corn stalk, after the stalk has been cut therefrom, down to ground level, or even below ground level, so as virtually to shred the stubble down to the roots.

The object in developing a machine which will so shred the standing stubble in this manner is to combat the ravaging corn insect commonly known as the corn borer. These insects live and lay their eggs in different portions of the corn plant, principally however the lower part of the stalk at or near the level of the ground, frequently in the first joint. In the ordinary corn harvester the stalks are cut off at a height several inches above the ground level, which leaves the infested part of the stalk standing in the field, and, as a result, these corn borers can continue to multiply and soon become so numerous that they are very destructive and difficult to exterminate.

In practically all prior types of corn harvesters or binders, the corn stalks are cut through the slicing action of a reciprocating sickle, disposed considerably above ground level. The adjustments generally provided on these machines to raise and lower the height of the sickle bar are inadequate to enable the sickle to be disposed at a sufficiently low point to remove the infested part of the stalk, and even if it were possible to dispose the sickle sufficiently low to remove the entire stalk, its operation at this point would be impracticable because of dirt engaging with the sickle knives.

In providing a corn harvester which will perform the above operation of shredding and splitting the stubble, I preferably employ a plurality of shredding elements grouped closely together, which elements are mounted in a frame attached to the main frame directly in rear of the sickle bar, and as the machine travels forward these elements in passing over the stubble shred and split it up, and virtually tear it to pieces. Said shredding elements are adapted to ride along the surface of the ground and preferably in such position that they cut into the ground somewhat, so that they shred and split the stalk down to the roots.

Other objects and advantages of the invention will be apparent from the following detailed description of a preferred embodiment thereof.

In the drawings accompanying this description:

Fig. 1 is a plan view of a harvester, showing somewhat schematically the principal parts of the harvester mechanism, with my improved stalk splitting attachment incorporated therein;

Fig. 2 is a rear view on an enlarged scale, partly broken away, of my improved stalk splitting attachment;

Fig. 3 is a sectional view taken on the line 3—3 of Fig. 2;

Fig. 4 is a side elevation of my improved attachment, indicating in dotted lines the transport position of the same;

Fig. 5 is a cross-section taken on the line 5—5 of Fig. 4;

Fig. 6 is a perspective view of one of the cutting or splitting discs;

Fig. 7 is a perspective view of one of the spacing washers used to space the cutting discs;

Fig. 8 is a perspective view of one of the bearing sleeves in which the shaft for the discs is mounted;

Fig. 9 is a perspective view of one of the scrapers, which is associated with each of the discs;

Fig. 10 is a side elevation of a modified form of shredding and splitting device;

Fig. 11 is a cross-section taken on the line 11—11 of Fig. 10, and

Fig. 12 is a perspective view of one of the cutting members shown in Figs. 10 and 11.

The frame and operating parts of the harvester are constructed and arranged in accordance with any standard practice, and, therefore, I shall only make brief reference to the principal elements of the haravester design, as they are well known in the art and in and of themselves are not a part of the present invention.

The machine comprises a main frame, indicated as a whole by the numeral 20, which frame is supported on inner and outer wheels 21, 22, which are generally referred to as the grain wheel and the drive wheel, respectively. A draft attachment frame 23, is generally connected to the main frame on the stubbleward side of the machine, as shown in Fig. 1, and a driver's seat 24 is mounted on a lateral extension 25 of the main frame 20. Two divergent gathering arms 26, 26 generally extend from the fore part of the machine and travel on each side of the corn row to guide the stalks into the machine. These gathering arms are usually provided with feeding means which feed the stalks into the throat 27, formed between the converging ends of the arms 26. My invention may be used with either a corn binder, in which the stalks after being cut are bound together in bundle form, or with a machine in which the stalks are merely cut and then discharged loosely from the machine. Various forms of discharge mechanism are employed in different types of machines for discharging the bundles from the machine. As the feeding and binding devices and the discharge mechanism have nothing to do with my present invention, they have not been shown.

Coming now to my improved means for splitting and shredding the corn stubble, 28 indicates an auxiliary frame U-shaped in outline and secured to the rear portion of the main frame 20, in line with the sickle or cutting bar indicated at 29, so that the cutting discs mounted on the frame 28 will pass over and cut or shred the stubble left in the rows by the sickle bar. The U-shaped frame 28 is mounted on the frame 20, so that it lies below said frame, and is secured thereto by means of a plurality of plates 30, which are connected to the frame bolts 31 and to the frame 28 by bolts 32, as shown in Fig. 2.

Extending downwardly from each side of the U-shaped frame 28 is an arm or bar 35, (Figs. 2 and 4) said arms being pivotally connected to said frame by pivot bolts 36, so that the arms 35 swing on the pivot bolts as an axis. This pivotal mounting of the arms 35 to the frame 28 is best shown in Fig. 2.

Mounted in the lower end of each of the arms 35 is a bearing sleeve 37 which is provided with a lug 38 adapted to engage in a notch in the arm 35, so as to prevent rotation of said sleeve in said arm, as shown in Figs. 4 and 8. Mounted to rotate in the bearing sleeve 37 are the reduced end portions 39 of a shaft 40 which, as shown in Fig. 2, extends between the arms 35.

Mounted on shaft 40 between the arms 35 are a plurality of splitting or shredding discs 41 which are spaced a suitable distance apart by means of spacing washers 42, as shown in Figs. 2, 3 and 5. Adjacent the reduced end bearing portions 39, of the shaft 40, said shaft is provided with screw-threaded portions 43, (Fig. 5) on which are threaded nuts 44. Between each set of nuts and its adjacent disc I provide a lock washer, 45, so that by tightening said nuts on said shaft against said lock washers, the discs are held securely in position, and the spacing washers 42 hold them in suitable spaced relation to each other.

Extending rearwardly and slightly upwardly from each of the arms 35 is a bar 46, one of which is shown in Fig. 4. These bars are connected to the arms 35 by means of rivets 47. Mounted in openings in the outer ends of said bars 46, so as to extend therebetween is a shaft 48 threaded at its ends and provided with nuts 49 for holding it in position in said bars. Mounted on the shaft 48, and so positioned as to extend downwardly and forwardly between the cutting discs from the rear side thereof, are a plurality of scraper bars 50, which are spaced apart by suitable washers 51. Said scraper bars are held in fixed position so that as the cutting discs 41 rotate while being moved along the ground in the operation of the machine, the scraper bars will dislodge dirt and pieces of the corn stubble which may stick between the discs, thereby preventing clogging of the discs so that they will efficiently operate at all times to thoroughly split and shred the corn stubble. The threaded engagement of the two nuts 44 on the shaft 40 enables the entire gang of discs 41 to be shifted bodily along said shaft to effect proper registration between the discs and the scraper fingers 50.

Mounted on the shaft 48, on each side of the series of scraper bars 50, is the apertured eye portion 52 of an eye bolt 54, only one of such eye bolts being shown in Fig. 2. Each of the apertured portions 52 is spaced from the scraper bars and from the adjacent arm 46 by a pair of spacing sleeves or washers 53, one at each side of the eye bolt. The upper shank portion of each eye bolt passes through a U-shaped bar 55, which extends across from one side to the other of the U-shaped frame 28. Said bar 55 is pivotally mounted at its ends in said U-shaped frame by means of pins 56, (Fig. 2.) Each of the bolts 54 is provided with screw threads at its upper end and a nut 57 is threaded thereon to hold it in position in said bar 55 (Figs. 1 and 4). Mounted on each of the bolts 54 is a coiled compression spring 58, surrounding said bolt, and being normally compressed between the U-shaped bar 55 and a shoulder 59 on the pivot eye 52.

It will be readily apparent that these two compression springs 58, being under tension, hold the discs which are mounted on the shaft 39 down in firm contact with the ground, or slightly below the ground level. In order to prevent the springs from throwing the discs too far forwardly, I provide stop-shoulders 60 at the upper ends of the bars 35, which shoulders contact with the under side of the frame 20 and prevent further movement forwardly of the bars 35, (Fig. 4.)

When it is desired to raise the discs from the ground into transport position for moving the harvester from one field to another, the lower end of the arms 35 are swung rearwardly and upwardly, the arms 35 swinging on the pivot bolts 36. At the same time the pivot eyes 52 turn on the shaft 48, and the U-shaped bar 55, in which the upper ends of the bolts 54 are mounted, turns on its pivot pins 56. As this upward movement progresses, the spring 58 is further compressed between the shoulder 59 on the pivot eye 52 and the bar 55, until the shaft 48 reaches a dead center position directly in rear of the pivot center 56. After passing this dead center position, the shaft 48 and the parts connected therewith are snapped upward suddenly by the expansion of the spring 58, until the parts reach the position shown in dotted lines in Fig. 4, at which point the upper edges 60' of the two side bar 35 strike the back of the main frame 20 and further upward movement is thereby prevented. It will be readily apparent that the springs will hold the parts in this upper, or transport, position until the machine is ready to be operated again in a field, at which time the operator presses down on the arms 35 and the springs are compressed until they again reach their dead center position, and when they pass such dead center position, the expansion of the spring snaps the shaft 48 and associated parts suddenly downwardly until the discs again come into contact with the ground.

It will be apparent from the foregoing description, that by means of my improved attachment the stubble left in the corn rows, after the stalks have been cut therefrom by the sickle bar, are thoroughly split up and shredded, and virtually torn to pieces, by the discs 41 as the harvester moves along the row. By this means, the corn borers and the eggs which are in the lower portion of the stalk will be thoroughly eradicated. By means of my improved arrangement, the discs are always held in firm contact with the ground by the springs, but when it is desired to raise the discs to transport position, this can be readily accomplished by simply raising the discs until the springs pass a dead center, as above explained, after which said discs will be held in transport, or raised position, by the springs, which then exert an upward pressure. The springs 58 also permit the discs to spring back yieldingly if they should strike a rock or other obstruction so that they can clear such obstruction without breakage. The rotation of the splitting discs enables the scraping fingers 50 to maintain the spaces between the discs clear of all refuse.

In Figs. 10, 11 and 12 I have shown a modified construction for splitting and shredding the corn stubble and the parts in this modified construction which are similar to the parts before described are indicated by the same reference numerals. In this modified form I provide a plurality of plates 65, spaced apart on the shaft 39 by spacing washers 42, in the same manner in which the discs in the previous construction are spaced apart on the shaft 39. These plates are preferably of the form shown in Fig. 12, and are each provided with a saw-tooth cutting edge 66, as shown. Said plates are provided with holes 67 near one end thereof whereby said plates are mounted on the shaft 39, and in order to hold the opposite ends of said plates down in operative position on or in the ground for splitting and shredding the stubble, I provide suitable spring means which tends to swing the rear ends of the plates down into the stubble and ground.

In this construction, there are no scraper bars, and centrally mounted on the shaft 48 is a frame substantially U-shaped and indicated as a whole by the numeral 68, as shown in Fig. 11. Said frame comprises side member 69, 69 which extend forwardly and downwardly as shown in Fig. 10. The frame is pivotally mounted on the shaft 48, centrally thereof, and is suitably spaced from the eye bolt portions 52 by means of a pair of long sleeves 70, one of which is mounted on the shaft on each side of the frame 68 and the adjacent eye bolt portion 52, as shown in said figure. The side members 69, 69 of the frame 68 converge inwardly into a laterally extending portion 71. Through an opening in said laterally extending portion 71 extends an eye bolt 72, the rear end portion of which is provided with screw threads on which is threaded a nut 73. A compression spring 74 is mounted on the eye bolt 72, one end of said spring bearing on the laterally extending portion 71 of the frame 68, while the opposite end thereof bears against a washer 75 mounted on said eye bolt and thrusting against said nut. The end of the eye bolt 72 forward of the frame 68 is provided with an eye portion 76, (Fig. 10).

A shaft 77 passes through alined openings 67' in the plates 65, which are positioned above and forward of the openings 67 through which the shaft 39 passes. The plates 65 are held in position on the shaft 77 by means of nuts 78, threaded on each end of the shaft, spacing washers 49 being preferably interposed between the plates 65 on the shaft 77. The eye bolt 72 is also mounted on the shaft 77 at the center thereof by means of the eye portion 76. The spring 74 is normally under pressure which may be adjusted by turning the nut 73 on the threaded end of the eye bolt 72, as will be readily apparent.

The spring 74, being thus under pressure will exert a pressure rearwardly and upwardly against the washer 75, pulling upwardly on the eye bolt 72, and thereby swinging the saw-toothed cutting edges 66 of the plates 65 down into engagement with the ground when the splitting and shredding device is in operative position so that the corn stubble is split and shredded and torn into pieces the same as in the preceding construction.

The mounting construction and the spring means for holding the shredding devices of my modified construction in transport and in operative positions are the same as that of the previous construction, above set forth in detail.

I wish it to be understood that my invention is not limited to the specific embodiment illustrated and described, but is generic in character and includes such alterations or modification as may occur to those skilled in the art. So far as I am aware, no one has heretofore proposed to provide a corn harvester or binder with means for splitting and shredding the stubble left in the field after the stalk has been cut therefrom by the sickle bar of the harvester.

I claim:

1. A harvesting implement adapted to cut the stalks of the plants and comprising means for splitting or shredding the stubble after the stalks have been cut.

2. A corn harvester comprising means for cutting the stalks, and means for splitting or shredding the stubble.

3. A corn harvester comprising in combination, a frame, of means mounted on said frame for cutting the stalks, and a plurality of cutting devices mounted on said frame for splitting and shredding the stubble.

4. A corn harvester, comprising in combination, a main frame, of means mounted on said main frame for cutting the stalks, an auxiliary frame secured to said main frame, a plurality of cutting devices mounted on said auxiliary frame, and means mounted on said auxiliary frame and operating to hold said cutting devices in operative position in contact with the ground.

5. A corn harvester, comprising in combination, a main frame, of means mounted on said main frame for cutting the stalks, an auxiliary frame secured to said main frame, a plurality of cutting devices mounted on said auxiliary frame, and means mounted on said auxiliary frame for holding said cutting devices in operative position in contact with the ground, said means also being operative to hold said cutting devices in inoperative position.

6. A corn harvester, comprising in combination, a main frame, of means mounted on said frame for cutting the stalks, an auxiliary frame secured to said main frame, a plurality of cutting devices mounted on said auxiliary frame, and spring means operating to hold said cutting devices in operative position in contact with the ground.

7. A corn harvester, comprising in combination, a main frame, of means mounted on said frame for cutting the stalks, an auxiliary frame secured to said main frame, a plurality of cutting devices mounted on said auxiliary frame, and spring means mounted on said auxiliary frame for holding said cutting devices in operative position in contact with the ground, said spring means also being operative to hold said cutting devices in inoperative position.

8. A corn harvester, comprising in combination, a main frame, of means mounted on said main frame for cutting the stalks, an auxiliary frame secured to said main frame, said auxiliary frame comprising a pair of downwardly extending members, a shaft mounted in the lower end portions of said members, a plurality of cutting devices mounted on said shaft between said downwardly extending members, and means mounted on said auxiliary frame for holding said cutting devices in operative position in contact with the ground.

9. A corn harvester, comprising in combination, a main frame, of means mounted on said main frame for cutting the stalks, an auxiliary frame secured to said main frame, said auxiliary frame comprising a pair of downwardly extending members, a shaft mounted in the lower end portions of said members, a plurality of closely associated cutting devices mounted on said shaft between said downwardly extending members, spring means mounted on said auxiliary frame for holding said cutting devices in operative position to shred the stubble, and means for limiting the forward movement of said downwardly extending members.

10. A corn harvester, comprising in combination, a main frame, of means mounted on said main frame for cutting the stalks, an auxiliary frame secured to said main frame, said auxiliary frame comprising a pair of downwardly extending members, a shaft mounted in the lower end portions of said members and extending therebetween, a plurality of discs mounted on said shaft, an arm secured to each of said downwardly extending members and extending rearwardly therefrom, a shaft mounted between said arms, and a plurality of scrapers mounted on said second shaft and extending between said discs.

11. A corn harvester, comprising in combination, a main frame, of means mounted on said main frame for cutting the stalks, an auxiliary frame secured to said main frame, said auxiliary frame comprising a pair of downwardly extending members, a shaft mounted in the lower end portions of said members and extending therebetween, a plurality of cutting devices mounted on said shaft, an arm secured to each of said downwardly extending members and extending rearwardly therefrom, a shaft mounted between said arms, a plurality of scrapers mounted on said second shaft and extending between said cutting devices, and yielding means mounted on said second shaft and on said auxiliary frame and operative to hold said cutting devices in operative position to shred the stubble.

12. A corn harvester, comprising in combination, a main frame, a means mounted on said main frame for cutting the stalks, an auxiliary frame secured to said main frame, said auxiliary frame comprising a pair of downwardly extending members, a shaft mounted in the lower end portions of said members and extending therebetween, a plurality of cutting devices mounted on said shaft, an arm secured to each of said downwardly extending members and extending rearwardly therefrom, a shaft mounted between said arms, a plurality of scrapers mounted on said second shaft and extending between said cutting devices, yielding means extending between said second shaft and said auxiliary frame and operative to hold said cutting devices in operative position to shred the stubble, said yielding means also being operative to hold said cutting devices in inoperative position.

13. A corn harvester, comprising in combination, a main frame, of means mounted on said main frame for cutting the stalks, an auxiliary frame secured to said main frame, said auxiliary frame comprising a pair of downwardly extending members, a shaft mounted in the lower end portions of said members and extending therebetween, a plurality of cutting devices mounted on said shaft, an arm secured to each of said downwardly extending members and projecting rearwardly therefrom, a shaft mounted between said arms, and yielding means mounted at one end on said second shaft, the opposite end portion of said yielding means being secured to a U-shaped member connected to said auxiliary frame, said yielding means being operative to hold said cutting devices in operative position in contact with the ground to shred the stubble.

14. A corn harvester, comprising in combination, a main frame, of means mounted on said main frame for cutting the stalks, an auxiliary frame secured to said main frame, said auxiliary frame comprising a pair of downwardly extending members, a shaft mounted in the lower end portions of said members and extending therebetween, a plurality of cutting devices mounted on said shaft, an arm secured to each of said downwardly extending members and projecting rearwardly therefrom, a shaft mounted between said arms, yielding means mounted at one end on such second shaft, the opposite end portion of said yielding means being secured to a U-shaped member connected to said auxiliary frame, said yielding means being operative to hold said cutting devices in operative position in contact with the ground, said yielding means also being operative to hold said cutting devices in inoperative position.

15. A corn harvester, comprising in combination, a main frame, a means mounted on said main frame for cutting the stalks, an auxiliary frame secured to said main frame, said auxiliary frame comprising a pair of downwardly extending members, a shaft mounted in the lower end portions of said members and extending therebetween, a plurality of cutting devices mounted on said shaft, an arm secured to each of said downwardly extending members and projecting rearwardly therefrom, a shaft mounted between said arms, a plurality of scrapers mounted on said second shaft and extending between said discs, and yielding means mounted at one end on said second shaft, the opposite end portion of said yielding means being secured to a U-shaped member connected to said auxiliary frame, said yielding means being operative to hold said cutting devices in operative engagement in contact with the ground.

16. A corn harvester, comprising in combination, a main frame, of means mounted on said main frame for cutting the stalks, an auxiliary frame secured to said main frame in rear thereof, said auxiliary frame comprising a pair of downwardly extending members, means mounted on said auxiliary frame for holding said downwardly extending members in operative position, a plurality of cutting devices having swinging support on said downwardly extending members, and means mounted on said auxiliary frame for holding said cutting devices in operative position to shred the stubble.

17. A corn harvester, comprising in combination, a main frame, of means mounted on said main frame for cutting the stalks, an auxiliary frame secured to said main frame in rear thereof, said auxiliary frame comprising a pair of downwardly extending members, spring means mounted on said auxiliary frame for holding said downwardly extending members in operative position, a plurality of pivotally swinging cutting devices connected to said downwardly extending members, and spring means mounted on said auxiliary frame for holding said cutting devices in operative position to shred the stubble.

18. A corn harvester, comprising in combination, a main frame, of means mounted on said main frame for cutting the stalks, an auxiliary frame secured to said main frame in rear thereof, said auxiliary frame comprising a pair of downwardly extending members, spring means mounted on said auxiliary frame for holding said downwardly extending members in operative position, a plurality of cutting plates connected to said downwardly extending members, and means mounted on said auxiliary frame for holding said cutting plates in operative position in contact with the ground to shred the stubble.

19. A corn harvester, comprising in combination, a main frame, of means mounted on said main frame for cutting the stalks, an auxiliary frame secured to said main frame in rear thereof, said auxiliary frame comprising a pair of downwardly extending members, a shaft mounted in the lower end portions of said members and extending therebetween, a plurality of cutting devices mounted on said shaft, an arm secured to each of said downwardly extending members and projecting rearwardly therefrom, a shaft mounted between said arms, a member mounted at one end on said second shaft and extending downwardly and forwardly therefrom, a rod connected to the opposite end of said member, spring means cooperating with said rod, and means connecting said rod with said cutting devices whereby said cutting devices are held in operative position in contact with the ground.

20. A corn harvester, comprising in combination, a main frame, of means mounted on said main frame for cutting the stalks, an auxiliary frame secured to said main frame in rear thereof, said auxiliary frame comprising a pair of downwardly extending members, a shaft mounted in the lower end portions of said members and extending therebetween, a plurality of cutting devices mounted on said shaft, an arm secured to each of said downwardly extending members and projecting rearwardly therefrom, a shaft mounted between said arms, a U-shaped member having its side members mounted on said second shaft and extending downwardly and forwardly therefrom, a rod mounted in the transversely extending portion of said U-shaped member, a spring tending to move said rod in one direction, and means connecting said rod with said cutting devices whereby said cutting devices are held in operative position in contact with the ground.

21. A stalk shredding attachment adapted to be connected to a corn harvester comprising in combination, a frame, a plurality of cutting devices mounted on said frame to shred the stubble, and spring means mounted on said frame for holding said cutting devices in operative position in contact with the ground, said spring means also being operative to hold said cutting devices in inoperative position.

22. A stalk shredding attachment adapted to be connected to a corn harvester comprising in combination, a frame comprising a pair of downwardly extending members, a shaft mounted in the lower end portions of said members, a plurality of cutting devices mounted on said shaft between said downwardly extending members to shred the stubble, and means mounted on said frame between said downwardly extending members for holding said cutting devices in operative position in contact with the ground, said means also being operative to hold said cutting devices in inoperative position.

OSCAR F. CARLSON.